Dec. 12, 1950     F. GRUSZECKI     2,533,367
WEATHERSTRIP INSTALLATION TOOL
Filed June 21, 1948
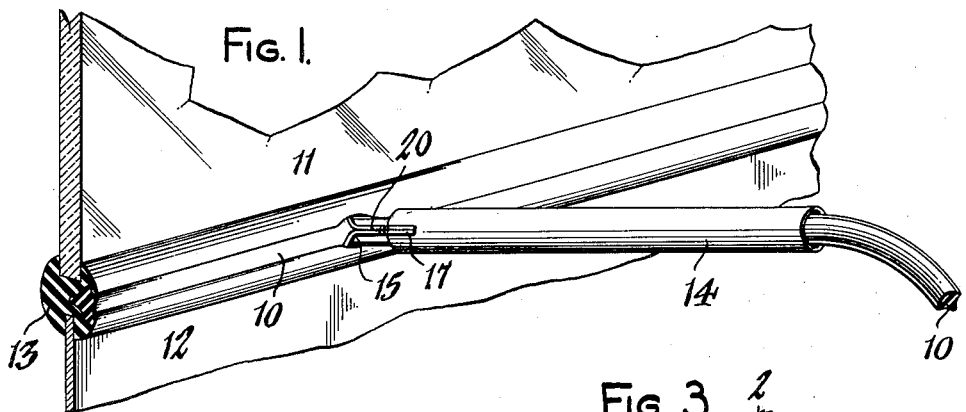
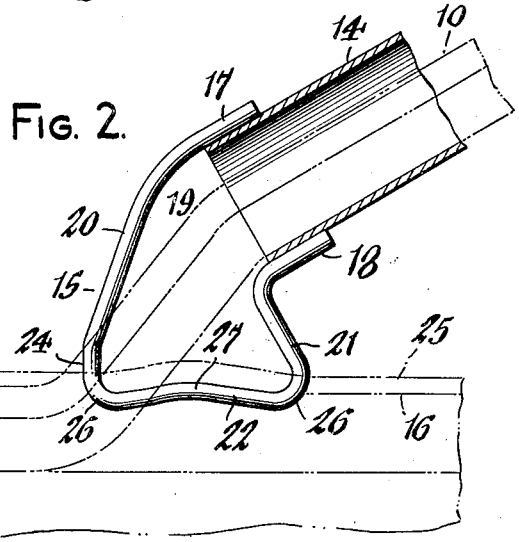
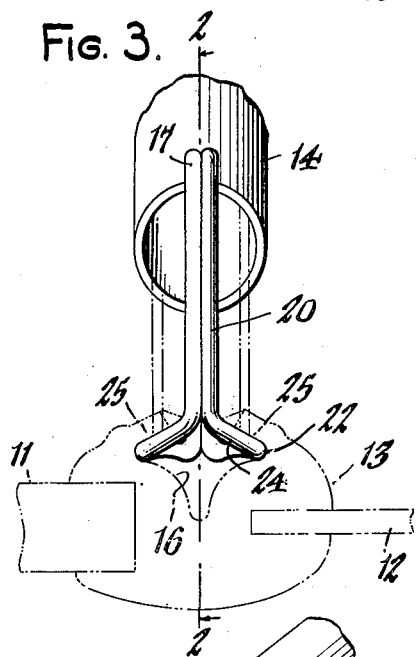
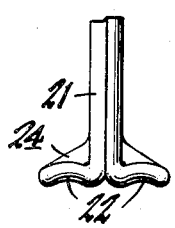
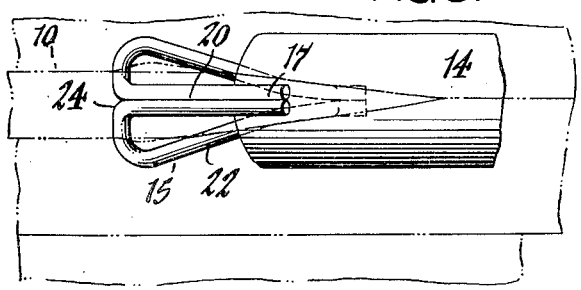
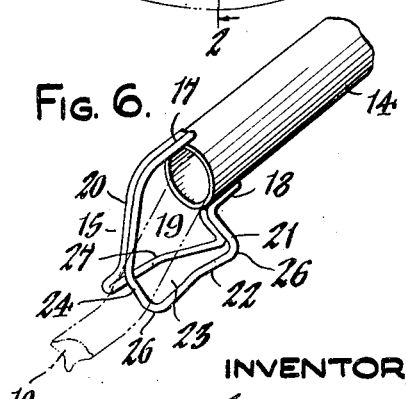
INVENTOR,
Frank Gruszecki,
BY Walter P. Guyer
ATTORNEY.

Patented Dec. 12, 1950

2,533,367

UNITED STATES PATENT OFFICE 2,533,367

WEATHER STRIP INSTALLATION TOOL

Frank Gruszecki, Buffalo, N. Y., assignor of one-half to Henry Rothenberg, Buffalo, N. Y.

Application June 21, 1948, Serial No. 34,200

3 Claims. (Cl. 29—270)

This invention relates generally to a weatherstrip installation tool, but more particularly to a tool for facilitating the insertion of a locking or sealing strip in the weatherstrip installation of car windows and the like.

One of the objects of the invention is to provide a tool of this character which is so designed and constructed as to effect the spreading of the weatherstrip channel and at the same time guide and direct the insertion of a sealing strip therein to complete the operation of sealing the weatherstrip to the window and its attaching body or panel.

Another object is to provide an installation tool of this character having a spreading head thereon of such shape as to afford an extensive and effective bearing with the channel-walls to insure the proper and ready insertion of the sealing strip in the channel and the subsequent overlapping of the weatherstrip over the marginal edges of the sealing strip as the tool is advanced.

Other features of the invention reside in the construction and arrangement of parts hereinafter described and particularly pointed out in the appended claims.

In the accompanying drawings:

Figure 1 is a fragmentary sectional perspective view of an automobile window installation showing my improved tool in its operative position of inserting the sealing or locking strip into the weatherstrip. Figure 2 is a fragmentary longitudinal section taken on line 2—2, Figure 3. Figure 3 is a fragmentary front end view of the operating head of the tool. Figure 4 is a fragmentary rear view of the same. Figure 5 is a fragmentary top plan view of the operating head of the tool. Figure 6 is a fragmentary perspective of such end of the tool.

Similar characters of reference indicate corresponding parts throughout the several views.

Referring now to Figure 1, wherein the improved tool is shown in operation for inserting a rubber sealing or locking strip 10 in place in a window installation of an automobile, 11 indicates the window and 12 the car body, while 13 indicates the customary multi-channeled rubber weatherstrip which is grooved at its opposite sides to receive the window glass and the body panel and at another side to receive the locking strip which functions to expand the weatherstrip snugly and firmly against the window and panel.

In its preferred construction, this tool comprises a hollow, endwise-opening handle 14 which may be of tubular or like form for the passage of the locking strip therethrough, and an operating head 15 projecting from one end of the handle for guiding and directing the locking strip 10 into the weatherstrip channel 16 and at the same time spreading the latter to receive such strip. As seen in Figure 1, the hollow handle also serves to properly support and guide the locking strip to the operating head of the tool during the insertion of the strip into the weatherstrip channel. The operating head is substantially loop-shaped and made from wire, being anchored at its free ends 17, 18 by welding or the like to the diametrically opposite top and bottom sides of the handle and with the loop-opening 19 disposed transversely to the axial opening in the handle. This loop-shaped head is shaped from two strands of wire disposed side by side, as shown in Figure 6, with the handle-attaching ends 17, 18 arranged in contiguous parallel relation, the end 17 continuing forwardly and obtusely in like contiguous fashion and in downwardly-sloping, overhanging spaced relation forwardly and centrally of the handle to a point substantially in the plane of the opposite side of the handle to provide a brace portion 20. The opposing attaching end 18 is bent downwardly in like contiguous fashion at substantially right angles to the handle to define a toe portion 21 which functions as a brace and an advance spreader for initially spreading the closed joint of the locking strip in the manner shown in Figures 2 and 5. The closed or span end of the loop-shaped head, indicated at 22, which constitutes the main spreader element of the tool and engages the channel 16 to distend the weatherstrip to a degree to direct the insertion of the locking strip 10 into the same as the tool is drawn lengthwise thereof in the manner depicted in Figure 1, is shaped with its strands laterally-spaced and diverging forwardly in the manner clearly shown in Figure 6. In the operative position of the tool, shown in Figures 1 and 2, this spreader element is so disposed as to substantially parallel the weatherstrip and it is formed by diverging its companion wire pieces or strands from the toe portion 21 to the brace portion 20 to provide a space or opening 23, the lower ends of the brace portion being likewise divergent downwardly to define a transverse, inverted V-shaped bearing element 24 to engage and bear with its inner side against the outer face of the locking strip and with its outer side beneath the opposing shoulders 25 of the weatherstrip-channel 16 to spread them outwardly and upwardly when such strip is being inserted into place. The opposite ends of the spreader element 22, where they join the opposing lower ends of the brace portion 20 and toe portion 21, are rounded, as indicated at 26, to facilitate the insertion of the tool into and its removal from the weatherstrip. Also, to reduce friction to a minimum when drawing the tool through the weatherstrip-channel 16, the diverging portions 22 are preferably obliquely bent upwardly, as shown at 27. It will be noted in Figure 2 that the brace portions 20, 21 converge upwardly from the ends of the spreader portion 22 to effectually support and brace the latter during the operation of the tool.

In operation, the locking or sealing strip 10 of the desired length is threaded through the handle 14 with its leading end extended downwardly through the opening 23 of the spreader portion 15 of the tool. This spreader portion is then inserted in the open end of the weatherstrip-channel 16 in the manner shown in the drawings, after which the tool is drawn along the same to guide and force the locking strip into sealing relation to the channel, it being understood that the tool moves relatively to the strip. The shape of the operating head of the tool is such that its toe portion 21 initially spreads the channel which is further distended by the diverging arm portions 22, while the downwardly diverging portions 24 not only force the strip into the channel but simultaneously spread the channel-shoulders 25 outwardly, and as the tool is advanced the shoulders resiliently overlap the longitudinal marginal edges of the locking strip to retain it in its proper sealed position.

While manifestly simple, compact and inexpensive in construction, this tool is very rugged, it affords a firm and extensive spreading contact with the channel-walls, and it is well braced to withstand the pressure exerted on it during the insertion of the locking strip into sealing relation to the weatherstrip. Furthermore, it is efficient in operation and it makes this normally difficult time-consuming task a simple one and requires but a minimum of time to insert the locking strip in position in a given installation.

I claim as my invention:

1. A tool for threading flexible material into a flexible-walled slot, comprising a hollow handle, means attached to and extending beyond one end of the handle and defining a material-threading portion and a wall-spreading portion, said means being composed of two strands of wire disposed side by side and bent into substantially the form of a closed loop with its axis crosswise of the handle, the loop-defining wire means having the strands thereof secured at one end to one side of the handle and extending forwardly and transversely therefrom in substantially contiguous relation and diverging outwardly to form a downwardly-facing, material-engaging guide, then converging rearwardly therefrom to form elongated wall-engaging and spreading portions and then extending upwardly at their rear ends and secured to the opposite side of the handle.

2. A tool for threading flexible material into a slot, the walls of which are flexible, comprising a hollow handle, a threading portion, elongated wall spreading portions and means for attaching said threading and wall spreading portions to said handle so that the same are located at the end of the handle and below an extension thereof, said threading portion including a forward material guide of V shape with its sides diverging away from each other and from said attaching means and joining the forward ends of said wall spreading portions, said wall spreading portions extending rearwardly from said threading portion and comprising spaced elongated sides converging together from their joinder with said threading portion to engage and spread the walls of the slot to receive the flexible material.

3. A tool for threading flexible material into a slot, the walls of which are flexible, comprising a hollow handle, a threading portion, elongated wall spreading portions and means for attaching said threading and wall spreading portions to said handle so that the same are located at the end of the handle and below an extension thereof, said threading portion, wall spreading portions and attaching means being formed of two wires secured together at one end to one side of said handle and extending therefrom in side by side relation forwardly and transversely of said handle past the opposite side thereof, the wires then diverging outwardly to form the threading portion or flexible material guide, then converging rearwardly to form said elongated wall engaging and spreading portions and then upwardly and joined to the opposite side of said handle.

FRANK GRUSZECKI.

REFERENCES CITED

The following references are of record in the file of this patent:

UNITED STATES PATENTS

| Number | Name | Date |
|---|---|---|
| 1,879,440 | Olson | Sept. 27, 1932 |
| 2,189,138 | Eichner | Feb. 6, 1940 |
| 2,255,307 | Barringer | Sept. 9, 1941 |